(12) United States Patent
Shono

(10) Patent No.: US 6,453,125 B2
(45) Date of Patent: Sep. 17, 2002

(54) CAMERA HAVING LIQUID CRYSTAL DISPLAY

(75) Inventor: Tetsuji Shono, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/796,366

(22) Filed: Mar. 2, 2001

(30) Foreign Application Priority Data

Mar. 6, 2000 (JP) ........................................ 2000-060238

(51) Int. Cl.⁷ .......................... G03B 13/02; G03B 11/04; G03B 17/18; H04N 5/222
(52) U.S. Cl. ........................ 396/287; 396/374; 396/378; 396/534; 348/333.08
(58) Field of Search .............................. 396/287, 373, 396/374, 534, 544, 383, 385, 386, 378; 348/333.01, 333.02, 333.03, 333.04, 333.05, 333.06, 333.07, 333.08, 333.09, 335, 341, 375, 376; 359/601, 611, 612

(56) References Cited

U.S. PATENT DOCUMENTS

| 5,179,478 A | | 1/1993 | Aoki |
|---|---|---|---|
| 5,465,132 A | * | 11/1995 | Mangelsdorf ............... 396/383 |
| 5,499,053 A | * | 3/1996 | Itoh ....................... 348/333.08 |
| 6,035,147 A | | 3/2000 | Kurosawa |

* cited by examiner

*Primary Examiner*—Alan A. Mathews
(74) *Attorney, Agent, or Firm*—Greenblum & Bernstein, P.L.C.

(57) ABSTRACT

A camera including a liquid crystal display is provided with a light interception hood mounting portion corresponding to the liquid crystal display, and a light interception hood which is detachably attached to the light interception hood mounting portion. The light interception hood is provided with a hood body which prevents external light entering the liquid crystal display when the light interception hood is attached to the light interception hood mounting portion, and a magnifier through which the liquid crystal display can be viewed.

6 Claims, 6 Drawing Sheets

CAMERA HAVING LIQUID CRYSTAL DISPLAY

BACKGROUND OF THE INVENTION

1. Field of the Invention

The present invention relates to a camera having a liquid crystal display.

2. Description of the Related Art

In a camera having a liquid crystal display in which an enlarged image to be taken can be indicated, it is possible to determine the composition of a picture of an object to be photographed and indicated in the liquid crystal display or to reproduce and indicate a photographed picture in the liquid crystal display. However, for example, if a picture is taken outdoors, where intense light such as sunlight is incident upon the liquid crystal display, there is a tendency for the image indicated in the liquid crystal display not being able to be seen clearly, since the backlight of the liquid crystal display is considerably weaker than the sunlight.

SUMMARY OF THE INVENTION

It is an object of the present invention to prevent intense light entering a liquid crystal display: of a camera whereby a picture indicated in the liquid crystal display can be clearly viewed.

To achieve the object mentioned above, according to the present invention, a camera is provided, including a liquid crystal display wherein the camera is provided with a light interception hood mounting portion corresponding to the liquid crystal display, and a light interception hood which is detachably attached to the light interception hood mounting portion. The light interception hood is provided with a hood body which prevents external light from entering the liquid crystal display when the light interception hood is attached to the light interception hood mounting portion, and a magnifier through which the liquid crystal display can be viewed.

Preferably, the camera further includes an attachment detecting device for detecting attachment of the light interception hood to the light interception hood mounting portion, and an adjusting device responsive to the attachment detecting device for adjusting the illuminance of a back light of the liquid crystal display.

The light interception hood can be provided with a light reflecting optical system which reflects an image of the liquid crystal display so that the image is incident on the magnifier.

The magnifier of the light interception hood can be a fish-eye lens system to reduce the thickness thereof. The magnifier of the light interception hood can be provided so as to be movable in a direction parallel with a plane in which a screen of the liquid crystal display lies. Accordingly, a portion of the image in the liquid crystal display can be selectively viewed.

According to another aspect of the present invention, a camera system is provided, including a camera and a light interception hood separate from the camera. The camera includes a liquid crystal display and a light interception hood mounting portion corresponding to the liquid crystal display. The light interception hood, which is detachably attached to the light interception hood mounting portion of the camera, includes a hood body which prevents external light from entering the liquid crystal display when the light interception hood is attached to the light interception hood mounting portion, and a magnifier through which the liquid crystal display can, be viewed.

The present disclosure relates to subject matter contained in Japanese Patent Application No. 2000-60238 (filed on Mar. 6, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
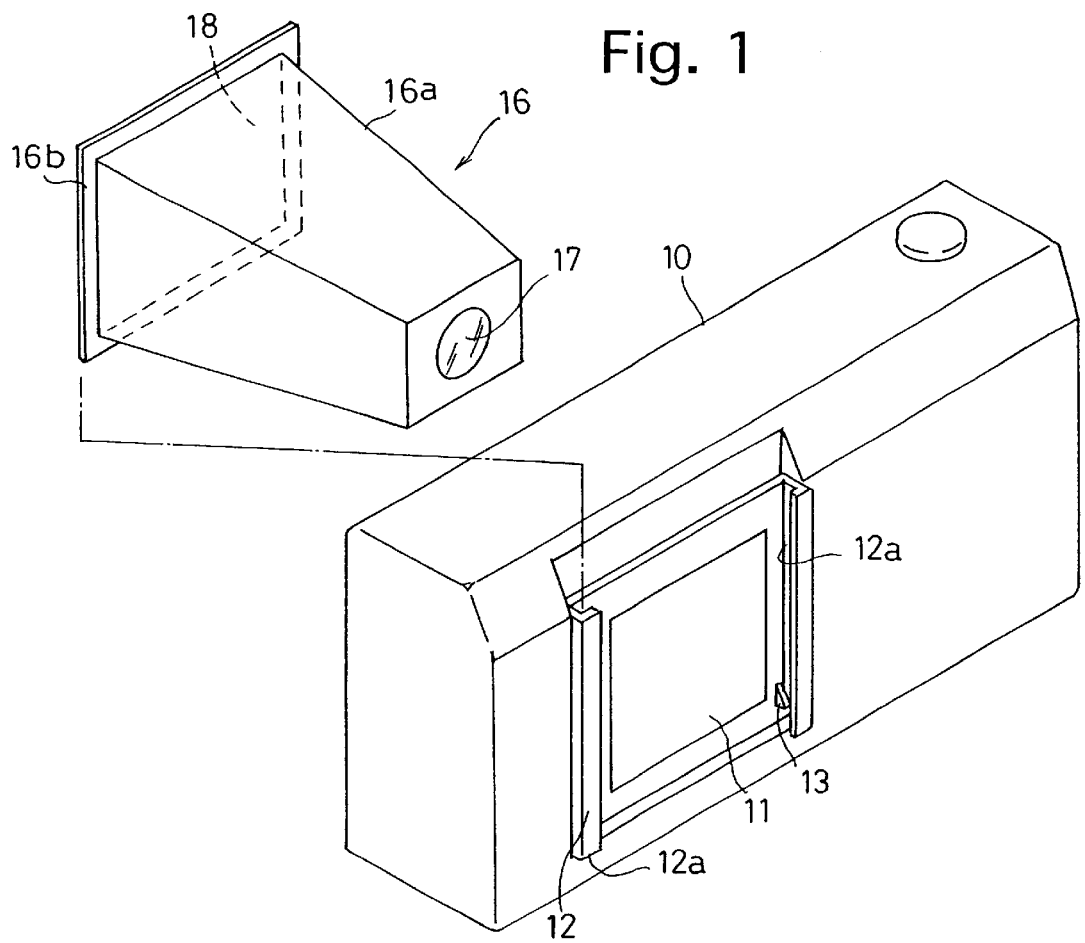
FIG. 1 is a perspective view of a first embodiment of a camera having a liquid crystal display and a light interception hood.

A digital camera 10 shown in FIG. 1 is provided on the rear surface thereof with a liquid crystal display 11 in which an image formed by a photographing lens 10a (see FIG. 2), and picked-up by an image pickup device, (not shown) is indicated. If intense light is incident on the liquid crystal display 11, the image indicated in the liquid crystal display cannot be seen clearly. Embodiments of the present invention to prevent external light from being incident on the liquid crystal display 11 will be discussed below with reference to the drawings.

Figure 2:
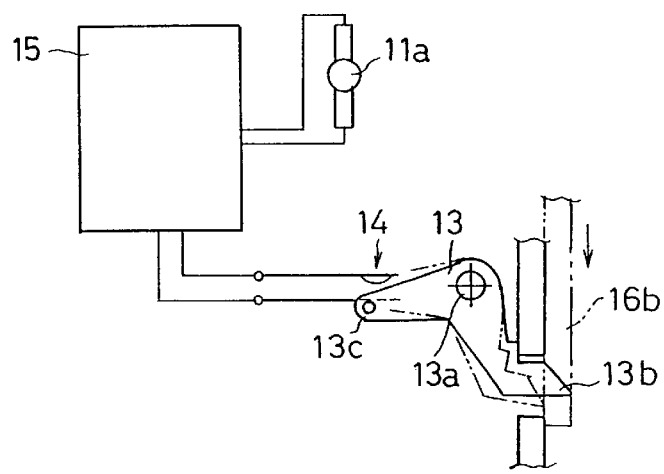
FIG. 2 is a schematic view of a detection device for detecting attachment and detachment of a light interception hood and an adjusting device for adjusting the illuminance of the backlight of a liquid crystal display.
Figure 3:
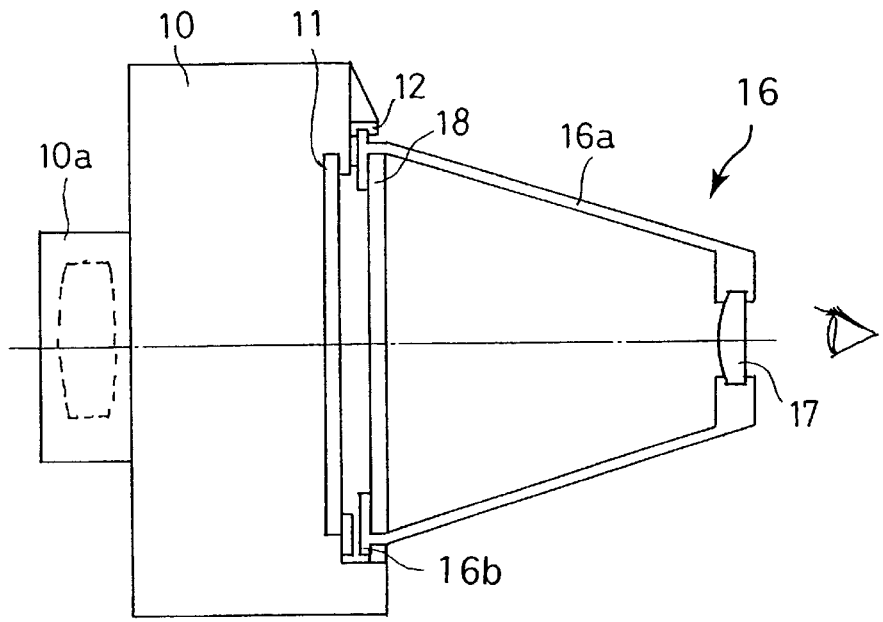
FIG. 3 is a cross sectional view of a camera having a light interception hood attached thereto, according to a first embodiment of the invention.

FIGS. 1 through 3 show a first embodiment of the invention in which the liquid crystal display 11 provided in the camera 10 is provided with a mounting shoe (light interception hood mounting portion) 12 (a pair of vertical rails 12a) on a peripheral portion thereof. A light interception hood 16 which can be detachably attached to the mounting shoe 12 includes a substantially rectangular tubular hood body 16a made of a light intercepting material, a Fresnel lens 18 in the hood body 16a, whose size corresponds to the size of the screen of the liquid crystal display 11, and a magnifier 17 which magnifies a picture image transmitted through the Fresnel lens 18. The hood body 16a is provided, on the side on which the Fresnel lens 18 is provided, with a peripheral foot portion 16b in the form of a flange which can be detachably attached to the mounting shoe 12. In the illustrated embodiment, the pair of vertical rails 12a extend in the vertical direction of the camera 10, however, it is possible to provide rails extending in the lateral (horizontal) direction.

The mounting shoe 12 is provided with an attachment detection member (attachment detecting device) 13. As can be seen in FIG. 2, the attachment detection member 13 is rotatable about a pivot shaft 13a and is continuously biased in the counterclockwise direction by a biasing device (not shown) such as a spring, so that a projection 13b thereof protrudes from the associated mounting shoe 12 (camera 10). When the foot portion 16b of the light interception hood 16 is attached to the mounting shoe 12 (pair of vertical rails 12a), the projection 13b is depressed, so that the attachment detection member 13 is rotated clockwise about the pivot shaft 13a in accordance with the movement of the projection 13b. Consequently, a pressing portion 13c of the attachment detection member 13 is rotated clockwise to turn a detection switch 14 ON. Conversely, when the light interception hood 16is detached from the mounting shoe 12, the detection member 13 is rotated counterclockwise to release the pressing portion 13c from the detection switch 14 to thereby turn the detection switch 14 OFF. When the detection switch 14 is turned ON, a control circuit (adjusting device) 15 reduces the brightness (dims) of a back light 11a of the liquid crystal display 11.

In the camera constructed as above, if it is difficult for an operator to see the indication of the liquid crystal display 11 due to external light incident thereupon, the light interception hood 16 is attached to the mounting shoe 12 of the camera 10 (FIG. 3). When the image is viewed through the magnifier 17, the image in the liquid crystal display 11 is clear in spite of the fact that the surrounding light is bright, since the external light is intercepted. Moreover, owing to the presence of the Fresnel lens 18, the image can be seen clearly even at the peripheral portion of the screen of the liquid crystal display. In addition to the foregoing, the control circuit 15 operates in response to the signal from the detection switch 14 which is turned ON when the light interception hood 16 is attached to reduce the brightness of the back light 11a of the liquid crystal display. Consequently, the brightness of the liquid crystal display 11 is made appropriate, and hence, not only can the image in the liquid crystal display be viewed clearly, but also the electrical power consumption can be reduced. Moreover, if the light interception hood 16 is unnecessary, for example when no interception of the external light is needed or the image in the liquid crystal display is viewed by many people at one time, the light interception hood 16 can be removed from the camera 10.

Figure 4:
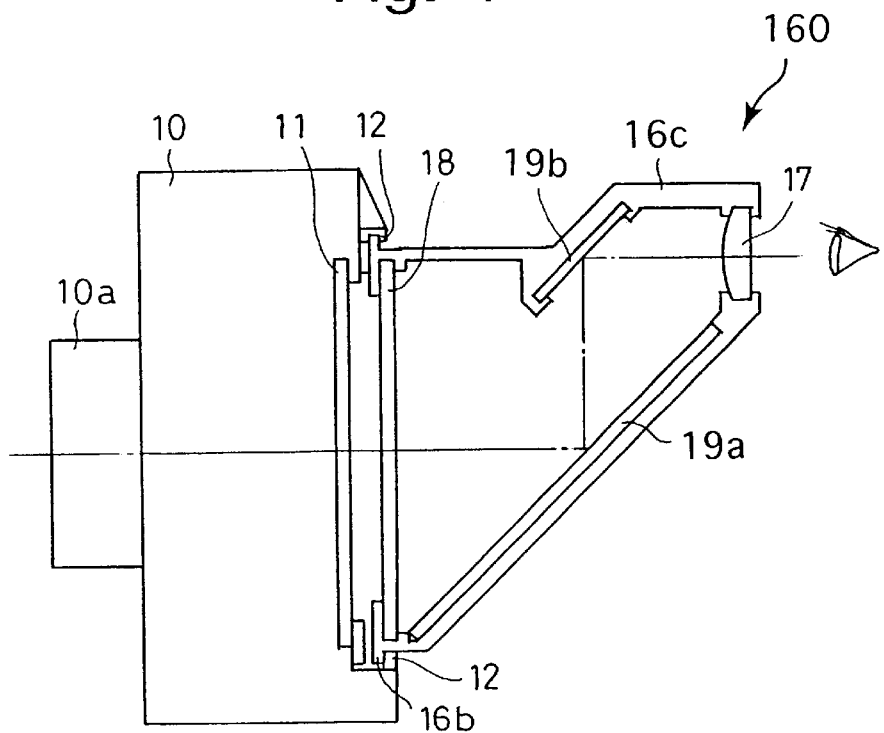
FIG. 4 is a cross sectional view of a camera having a light interception hood attached thereto, according to a second embodiment of the invention.

FIG. 4 shows a second embodiment of the present invention in which a hood body 16c of the light interception hood 160 is provided with a light reflecting optical system which includes a first mirror (first reflection surface) 19a and a second mirror (second reflection surface) 19b, wherein the light interception hood 160 is constructed smaller than the light interception hood 16 of the first embodiment. In the second embodiment, light emitted from the liquid crystal display 11 and transmitted through the Fresnel lens 18 is reflected by a first mirror 19a by 90 degrees and is reflected by a second mirror 19b by 90 degrees, so that an image magnified by the magnifier 17 can be viewed. Consequently, it is possible to reduce the thickness of the light interception hood 160 (in the right and left direction in FIG. 4). As in the first embodiment, the light interception hood 160 is provided with the foot portion 16b and the camera 10 is provided with the attachment detection member 13, the detection switch 14, and the control circuit 15, so that the brightness of the back light 11a of the liquid crystal display can be reduced when the light interception hood 160 is attached.

Figure 5:
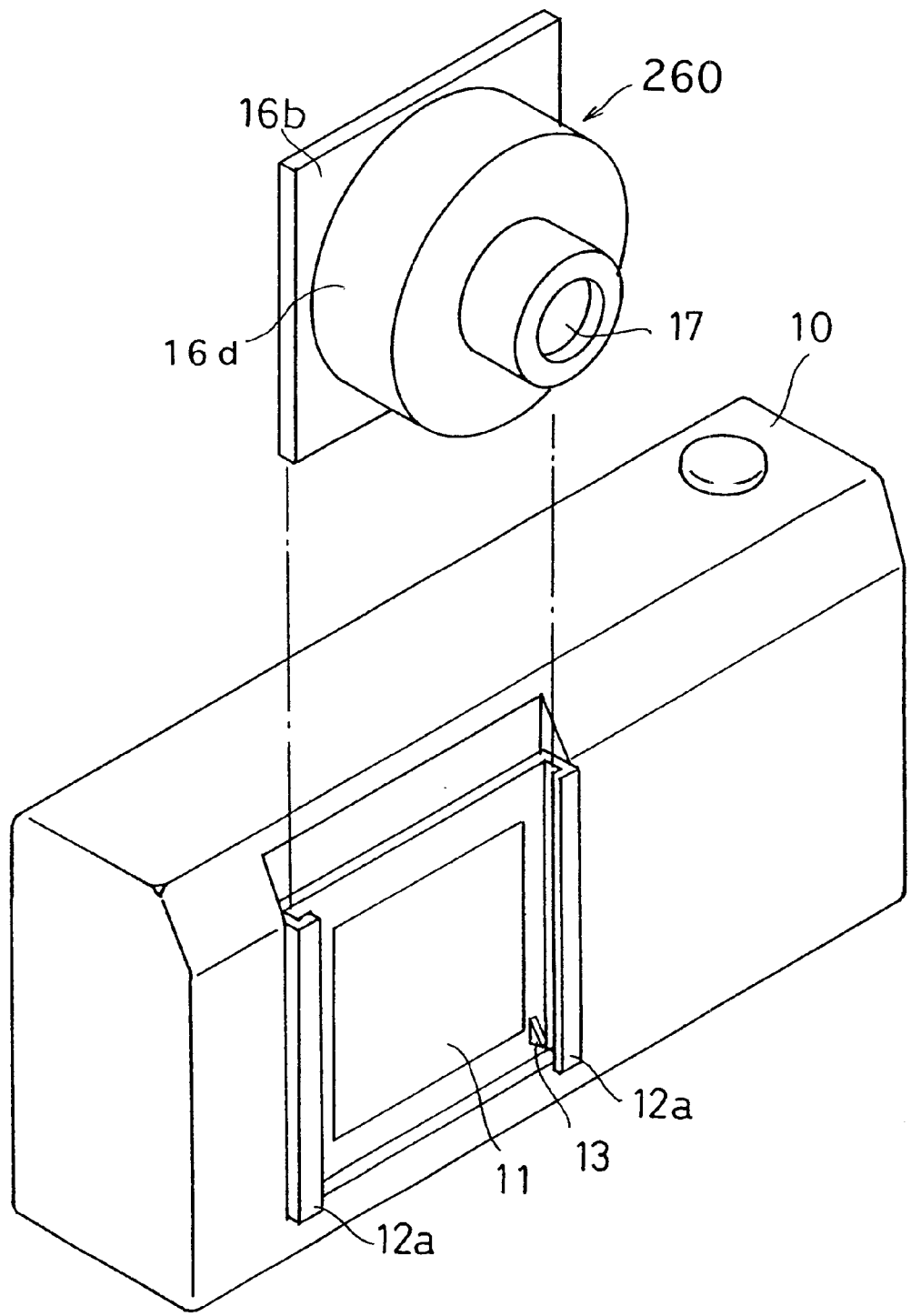
FIG. 5 is a perspective view of a third embodiment of a camera having a liquid crystal display and a light interception hood.
Figure 6:
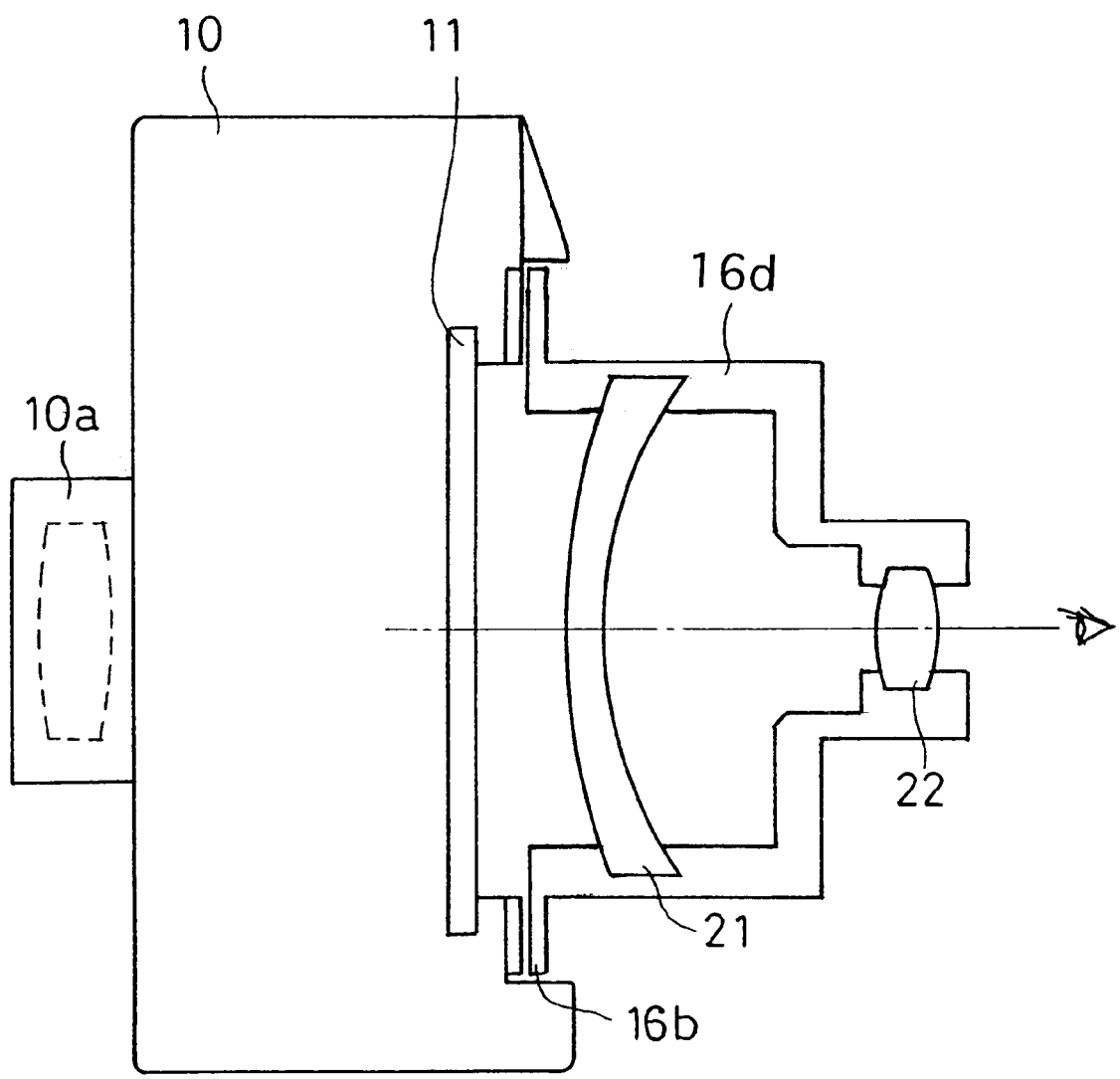
FIG. 6 is a cross sectional view of a camera having a light interception hood attached thereto, according to a third embodiment of the invention.

FIGS. 5 and 6 show a third embodiment of the present invention. In the third embodiment, the light interception hood 260 is provided on the cylindrical hood body 16d with the magnifier 17 incorporated therein. The magnifier 17 is constructed as a fish-eye magnifier (fish-eye lens system) providing a negative distortion and having a negative lens (group) 21 and a positive lens (group) 22. In the magnifier 17, substantially all of a photographic image of the liquid crystal display 11 can be viewed so that the portion of the photographed image that is indicated in the center portion of the screen of the liquid crystal display 11, which is generally considered most important, is enlarged, and the portion of the photographed image that is indicated in the periphery of the screen of the liquid crystal display 11 is distorted. Moreover, the magnifier 17, which is small in the optical axis direction, contributes to miniaturization of the light interception hood 260. As in the first embodiment, the light interception hood 260 is provided with the foot portion 16b and the camera 10 is provided with the attachment detection member 13, the detection switch 14, and the control circuit 15, so that the brightness of the back light 11a of the liquid crystal display can be reduced when the light interception hood 260 is attached.

Figure 7:
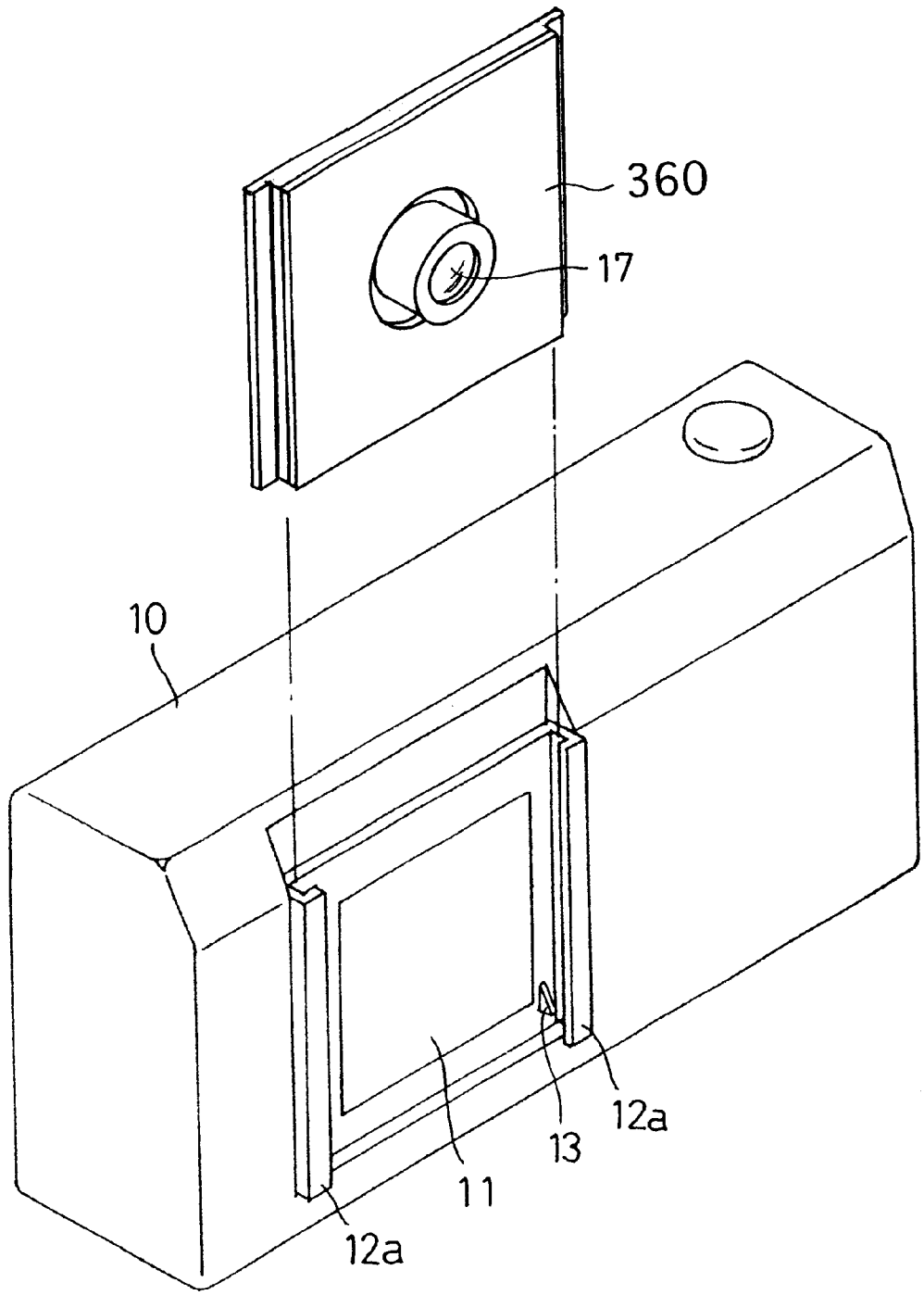
FIG. 7 is a perspective view of a fourth embodiment of a camera having a liquid crystal display and a light interception hood.
Figure 8:
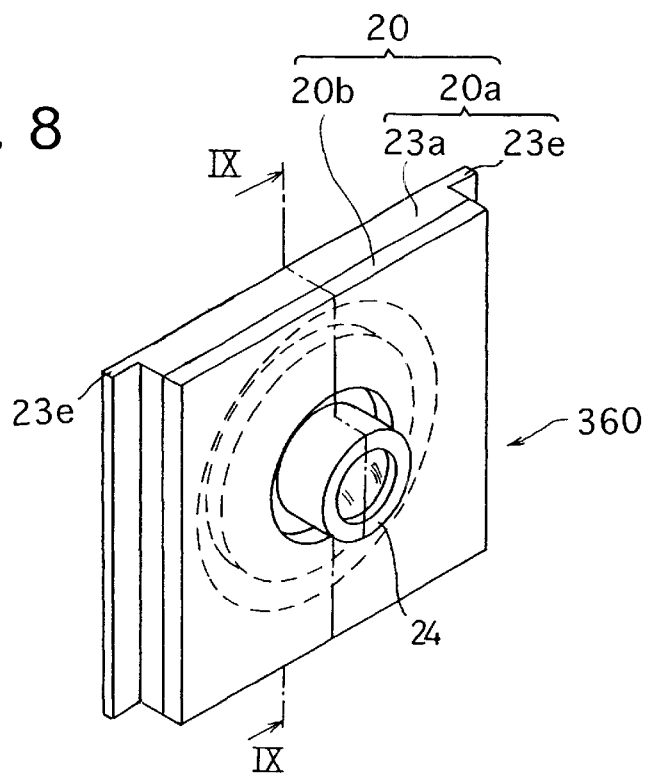
FIG. 8 is a perspective view of a light interception hood according to a fourth embodiment.
Figure 9:
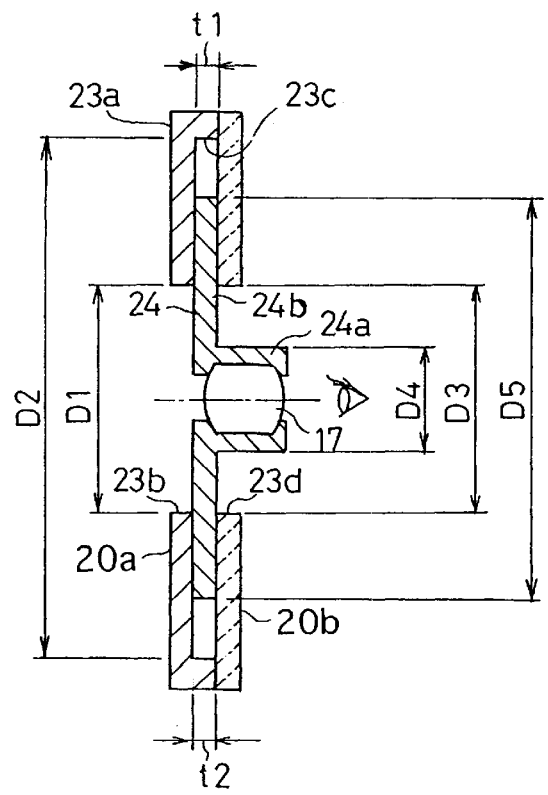
FIG. 9 is a sectional view taken along the line IX—IX in FIG. 8.

FIGS. 7 through 9 show a fourth embodiment of the present invention, in which a part of the image in the liquid crystal display 11 is selected and is enlarged by the magnifier 17. The magnifier 17 is slidable in the direction parallel with a plane in which the screen of the liquid crystal display 11 lies.

Namely, the light interception hood 360 in the fourth embodiment is provided with a lens holder 24 which holds the magnifier 17 and a hood member 20 which supports the lens holder 24 so as to be slidable within the hood member 20. The lens holder 24 is provided with a barrel portion 24a, having an outer diameter D4, which holds the magnifier 17. The barrel portion 24a is provided, on an end face thereof adjacent to the liquid crystal display 11, with a flange 24b having an outer diameter D5 and a thickness t2. The hood member 20 includes a base substrate 20a which is made of a rectangular plate portion 23a which covers the liquid crystal display 11 and foot portions 23e formed at right and left ends of the plate portion 23a, and a cover plate 20b which is identical in size to the base substrate 23a and is provided with a hole 23d having diameter D3 (>D4). The base substrate 20a is provided, on the plate portion 23a thereof, with a central through hole 23b having diameter D1, and is provided on the surface of the plate portion 23a away from the liquid crystal display 11, with a recess 23c having a diameter D2 (>D5) and a depth t1 (>t2). The lens holder 24 is supported so as to be slidable with respect to the hood member 20 by the flange 24b of the lens holder 24 being fitted into the recess 23c of the base substrate 20a and by covering and securing the cover plate 20b on the base substrate 20a. Similar to the first embodiment, in the fourth embodiment, the brightness of the back light 11a of the liquid crystal display can be reduced when the light interception hood 360 is attached.

According to the fourth embodiment of the light interception hood 360 constructed as described above, the image in the liquid crystal display 11 can be selectively viewed by moving the barrel portion 24a (magnifier 17) within the range in which the outer diameter portion of the flange 24b comes into contact with the inner diameter portion of the recess 23c or the outer diameter portion of the barrel portion 24a comes into contact with the hole 23d. Moreover, the small and thin magnifier, 17 makes it possible to reduce the thickness of the light interception hood 360.

The above-described first through fourth embodiments of the present invention have been applied to a digital still camera, however, the invention can be applied to any camera having a liquid crystal display, including, for example, an eight-millimeter video camera, etc.

As can be understood from the above discussion, in a camera having a liquid crystal display according to the present invention, the image in the liquid crystal display can be viewed clearly even outdoors, by using the light interception hood. Furthermore, since the light interception hood can be detachably attached to the camera, the light interception hood can be employed without increasing the size of the camera. Moreover, if the camera is provided with an attachment detecting device (detection member 13) for detecting the attachment and detachment of the light interception hood and an adjusting device for adjusting the illuminance of the back light of the liquid crystal display, it is possible to appropriately reduce the brightness of the back light of the liquid crystal display when the light interception hood is attached, so that not only can the image in the liquid crystal display be clearly viewed, but also the electric power consumption can be reduced. In addition, the light interception hood can be made small by constructing the optical system of the light interception hood so as to include a combination of mirrors, or a fish-eye magnifier, or by constructing the optical system of the light interception hood so as to be movable in a direction parallel to a plane which is parallel to the surface of the liquid crystal display.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising a liquid crystal display wherein:
    said camera is provided with a light interception hood mounting portion corresponding to the liquid crystal display;
    said camera includes a light interception hood which is detachably attached to the light interception hood mounting portion; and
    said light interception hood is provided with a hood body which prevents external light from entering the liquid crystal display when the light interception hood is attached to the light interception hood mounting portion, and a magnifier through which the liquid crystal display can be viewed.

2. The camera according to claim 1, further comprising:
    an attachment detecting device for detecting attachment of the light interception hood to the light interception hood mounting portion; and
    an adjusting device responsive to the attachment detecting device for adjusting the illuminance of a back light of the liquid crystal display.

3. The camera according to claim 1, wherein said light interception hood is provided with a light reflecting optical system which reflects an image of the liquid crystal display so t hat said image is incident on the magnifier.

4. The camera according to claim 1, wherein the magnifier of the light interception hood comprises a fish-eye lens system.

5. The camera according to claim 1, wherein the magnifier of the light interception hood is movable in a direction parallel with a plane in which a screen of the liquid crystal display lies.

6. A camera system comprising a camera and a light interception hood separate from said camera;
    said camera comprising a liquid crystal display and a light interception hood mounting portion corresponding to said liquid crystal display; and
    said light interception hood, which is detachably attached to said light interception hood mounting portion of the camera, comprising a hood body which prevents external light from entering the liquid crystal display when the light interception hood is attached to the light interception hood mounting portion and a magnifier through which the liquid crystal display can be viewed.

* * * * *